Sept. 10, 1957 R. M. GAGE 2,806,124
ARC TORCH AND PROCESS
Filed July 26, 1955 3 Sheets-Sheet 1
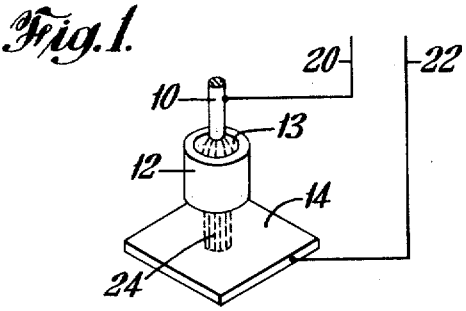
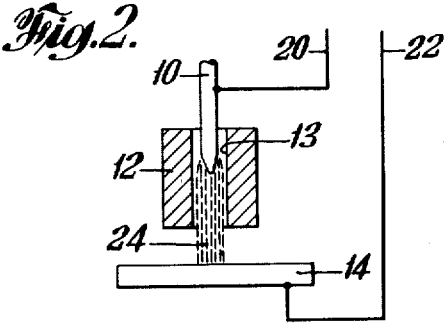
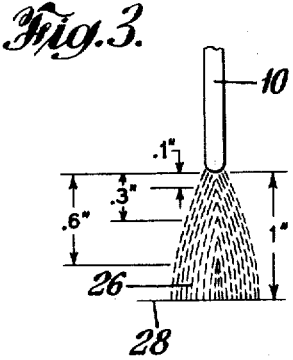
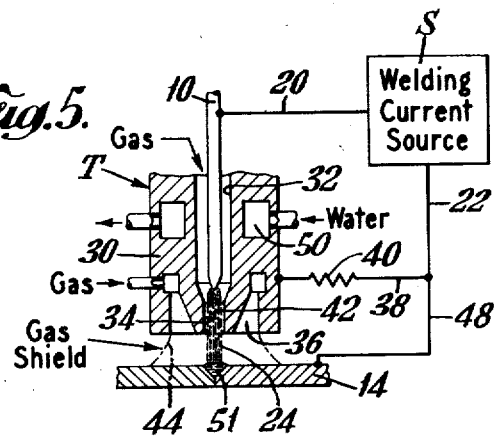
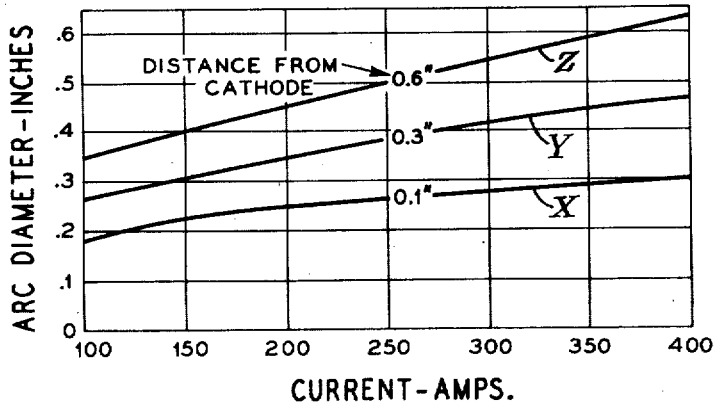
INVENTOR
ROBERT M. GAGE
BY
Barnwell R. King
ATTORNEY

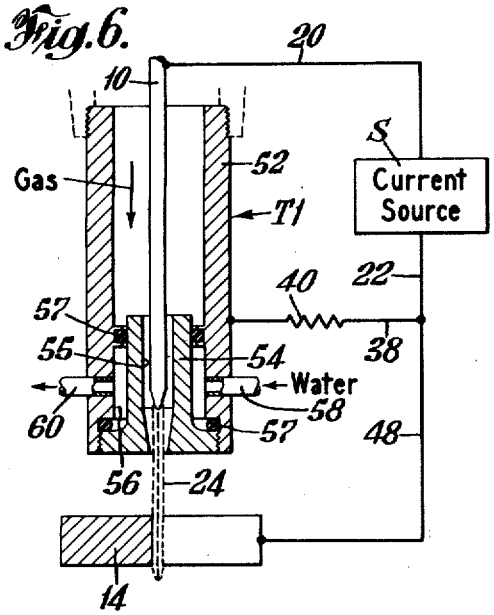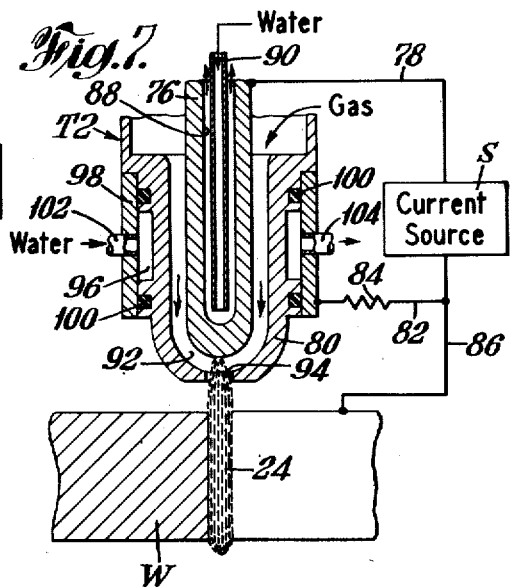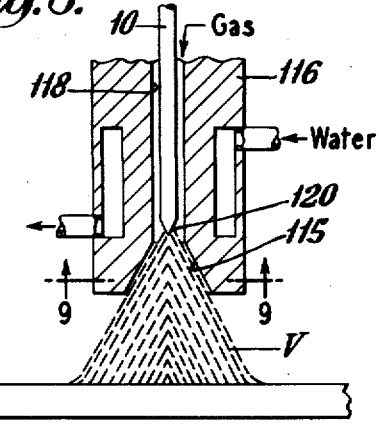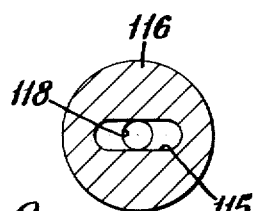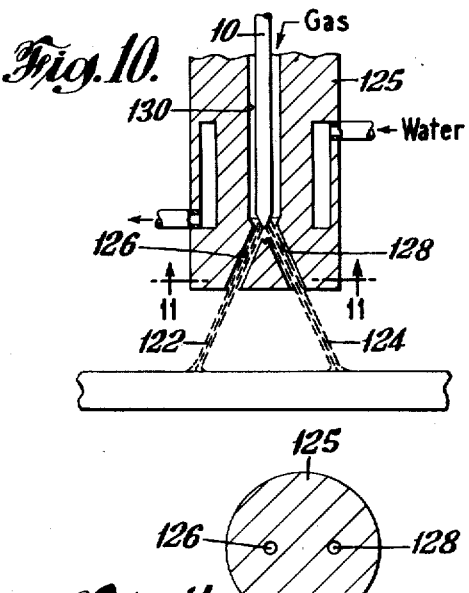
INVENTOR
ROBERT M. GAGE

Sept. 10, 1957  R. M. GAGE  2,806,124
ARC TORCH AND PROCESS
Filed July 26, 1955  3 Sheets-Sheet 3

INVENTOR
ROBERT M. GAGE
BY
Carnwell P. King
ATTORNEY

2,806,124
Patented Sept. 10, 1957

2,806,124

ARC TORCH AND PROCESS

Robert M. Gage, Buffalo, N. Y., assignor to Union Carbide Corporation, a corporation of New York Application July 26, 1955, Serial No. 524,353

29 Claims. (Cl. 219—121)

This invention relates to high-pressure electric arcs and more particularly to a fundamentally novel arc process and apparatus.

Briefly, according to the invention there is provided a process which comprises establishing a high-pressure arc between an electrode and a workpiece, wall-stabilizing a portion of the length of the arc, to produce and control the shape and direction of an effluent between the point of the wall-stabilization and the workpiece, and applying the so-controlled effluent to the workpiece.

Further, according to the invention, there is provided an arc torch comprising an arc electrode, and means having a passage through which the arc and the arc gases pass. Such torch is provided with a non-consumable solid wall which laterally restricts the arc and gases and which passages discharges a current-carrying effluent. Such effluent a stable, directional and shaped so as to follow a well-defined path the cross-section of which is determined by the geometry of the passage.

The principal feature of the invention is the use of suitable means such as a non-consumable nozzle composed of a cooled solid material having arc passage means from which an electric current carrying effluent issues. Such passage "wall-stabilizes," laterally shapes and/or constricts the arc, concentrating or redistributing the energy thereof, defines the shape and direction of the effluent, and discharges the latter.

The novel combination and extension of such physical principles of wall-stabilization and construction is effectively applied, according to the present invention, to cutting and welding arcs, as well as to other material heating arcs, at currents of the order of hundreds and even thousands of amperes, with strikingly unexpected and useful results, as will be explained below.

The invention can be explained by considering first a conventional non-consumable electrode-inert gas shielded arc-type set-up with a tungsten electrode above, a metal workpiece-electrode below, and a gas supplied around the electrode and arc to shield the electrode from the air. With such set-up is combined, according to the invention, a water-cooled collar or nozzle of metal, for example, which surrounds and laterally confines a portion of the arc-column at or just below the tungsten electrode in a manner which wall-stabilizes and constricts, to some degree, the surrounded portion of the arc. It should be emphasized that to be effective such nozzle should have a maximum orifice diameter at least small enough so that the arc portion within it does not appreciably deviate in direction on account of otherwise disturbing influences such as random magnetic fields, gaseous convection and erratic behavior at the electrodes.

The criterion used herein is that if a given arc portion is observedly wall-stabilized, the nozzle orifice is sufficiently proximate to the arc to accomplish the purposes of the invention. The orifice can be made much smaller with additional remarkable results as will be shown below. The minimum length of the so-surrounded portion of the arc does not seem to be critical, at least down to that compatible with mechanical requirements of cooling the nozzle against the intense heating effect.

The arc portion between the outlet of the arc-stabilizing nozzle and the workpiece has its initial direction fixed by wall-stabilization and has stiffness and persistence of direction. This directional fixing of such arc portion is a great improvement over the prior art. The stiffness of the arc is, however, additionally dependent upon the flow of gas entering the torch electrode end of the nozzle. It is convenient and preferred that a controllable supply of gas be introduced to the nozzle orifice and be regulated to control the stiffness and momentum of the effluent, and also to more effectively extend the advantages of wall-stabilization thereto. This flow of gas also materially aids in transferring to the work heat which otherwise would go to the nozzle. This reduces the problem of cooling the nozzle.

It has been mentioned that although there is a maximum size nozzle orifice for wall-stabilizing a given portion of the arc, the orifice can be made much smaller with highly beneficial and useful results. It has been discovered that a cooled metal nozzle of the invention can be used, not only to wall-stabilize metal working or material heating arcs but, by using smaller orifices, can also constrict the arc thereby increasing the arc voltage and total arc power at a given current. Under such conditions the flow of gas through the nozzle causes an additional increase in arc voltage and power because much of the flowing gas becomes part of the arc and must be heated to arc temperatures (8000° K. to 20,000° K., estimated for argon).

Also, because the arc stream and gas jet, as they issue from the nozzle, are essentially the same hot gas, the cross-sectional area and shape imposed on the effluent by the nozzle is that of the arc. Also, because of the inherent stability, longer and thus higher voltage arcs can often be used than were possible or practicable in the past. The net result from the higher arc voltage or power and the reduced cross section of the arc is an exceptionally high energy flow per unit cross-sectional area at any given current.

Additionally, since the velocity of gas issuing from a nozzle at a given pressure (including the critical or sonic velocity) increases with the temperature, and because arc gas temperatures are the highest generally obtainable, the gas velocity through the nozzle of the invention for a given pressure can be made exceptionally high. Exceptionally high gas velocities are useful in many applications due to the attendant momentum and directed kinetic energy imparted to the effluent.

The desired momentum and directed kinetic energy of the effluent are achieved by the invention with great economy of gas. At constant pressure the volume of a given weight of gas ideally is proportional to the temperature of the gas. The velocity of gas for a given mass rate of flow through an orifice thus will be higher for a higher temperature gas. Since most, if not all, of the gas in the torch of the invention passes through, and in fact, comprises the arc, it is evident that, due to very high gas temperatures, high velocities can be achieved by a minimum expenditure of gas.

It should be emphasized that the arc stream of the invention and the jet of hot gas issuing from the nozzle are one and the same effluent. The jet of gas is the current-carrying arc stream and it thus continues to receive electrical energy until it reaches the workpiece. The combination in which a high velocity jet and a high-energy density, current-carrying arc stream are virtually coextensive, produces unique results best exemplified in the use of the invention for the cutting of some metals at speeds, quality of cuts, and economy superior to those of prior arc-cutting processes.

Some of the above and other features are further disclosed below. In any arc device, the arc is drawn from one electrode toward another electrode, such as the workpiece, by the potential gradient existing between such electrodes. In unrestricted arcs, this is relatively weak and is sometimes undesirably dominated by extraneous external influences, such as magnetic fields and drafts. The result is an unstable arc which, due to known vagaries of motion of the cathode and anode spots, is sometimes erratically and undesirably deflected out of control away from the work point where it is needed. To minimize such undesirable condition, it was sometimes necessary in prior metal welding practice, for example, to hold the electrode tip close to the work, thus increasing its vulnerability to inadvertent, unwanted contamination by the molten work metal. My invention advantageously minimizes such erratic deflections of the arc by wall-stabilizing a portion of the length thereof and imparting controlled momentum to the effluent.

Still another feature of the invention is the unique collimation in the effluent of the energy flow. Due to the divergent or flaring shape of the usual unconfined arc as, for example, one used in inert gas shielded-arc welding, accurate arc length control is desirable in order to achieve a uniform power density on the work with uniform penetration and bead width. In contrast, by control of nozzle geometry, the effluent of the invention as it issues from the nozzle can be made to maintain its directed motion in the form of a collimated flow of energy having a power intensity that is relatively independent of the arc length.

According to the invention, there is provided a "basic" torch that comprises a primary electrode which is mounted adjacent the inlet of a water-cooled nozzle to provide a locus for one end of an arc. The other end of such arc is carried by another primary electrode such as the workpiece. A gas stream is delivered to such nozzle so as to issue therefrom with the arc toward the work. While it is not necessary that such gas stream be delivered to the inlet of the nozzle under pressure, in some cases the latter is highly beneficial and greatly improves the operation. The gas may be any suitable gas or mixture of gases. The basic torch of the invention may be tailored to perform a desired job in controlling the effluent through the use of one or more nozzle orifices of the same or different cross-sectional areas, directions and shapes.

The invention has proved to be exceptionally suitable for cutting (severing) metals when the work itself is a primary electrode, the primary torch electrode is thoriated tungsten, the gas is argon, and the current is direct current-straight polarity (work positive).

The invention includes the use of alternating current with or without superimposed high-frequency, as well as direct current-straight or reverse polarity, for energizing the arc. A convenient adjunct of the invention is the use of a pilot arc drawn between the torch electrode and the nozzle which keeps the end of the electrode hot and facilitates the initiation and operation of the main arc. Operations involving the heating and melting of any metal are within the scope of the invention which, however, is not restricted thereto except as claimed.

In the drawings:

Fig. 1 is a perspective view of an elementary form of the invention in which the primary electrodes are a workpiece and a rod;

Fig. 2 is a sectional view of a modification of the invention;

Fig. 3 is a view in side elevation of a prior conventional unrestricted inert gas-shielded arc;

Fig. 4 is a graph illustrating three curves taken at different distances from the electrode of Fig. 3 in which arc-diameter is plotted against arc current;

Fig. 5 is a view partly in the form of a circuit diagram illustrating a butt-welding operation of the arc torch, parts of which are shown in vertical-longitudinal cross section;

Fig. 6 is a similar view illustrating a cutting (severing) operation of another form of the arc torch;

Fig. 7 is a similar view illustrating a direct current-reverse polarity hook-up of a water-cooled electrode modification of the arc torch;

Fig. 8 is a similar view illustrating a fan-shaped arc modification of the invention;

Fig. 9 is a view in cross section taken on line 9—9 of Fig. 8;

Fig. 10 is a fragmentary longitudinal-vertical section of a split-arc modification;

Fig. 11 is a cross section taken on line 11—11 of Fig. 10; and

Figure 12:
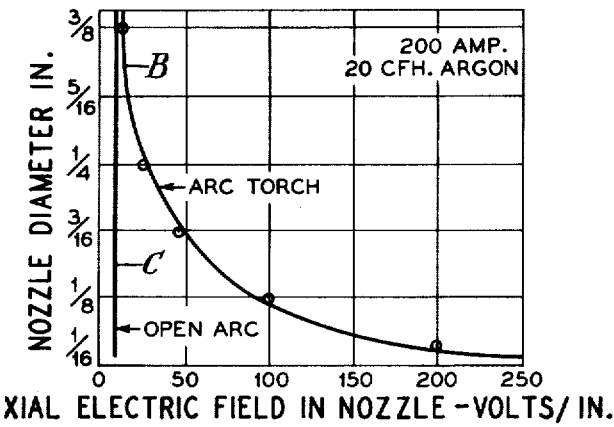
Figs. 12–15 are graphical representations illustrating operating conditions.

It will be understood that the elementary torch modifications of the invention shown in Figs. 1 and 2 are supplied with a suitable gas, such as argon, helium, hydrogen, nitrogen, or mixtures thereof, which gas preferably is caused to flow axially in an annular stream about a suitable primary electrode 10 and then through a nozzle 12 provided with an internal passage 13 which characterizes the invention, either by the aspirating action of the arc itself, or by supplying such gas under pressure. Typically, according to the invention, the electrode 10 is of the pencil, rod or stick type provided with an arc-locus tip axially aligned with and adjacent to one end of the nozzle 12. The other primary electrode may, for example, be a metal workpiece (plate) 14. The nozzle 12 may itself also serve as a secondary electrode as pointed out below. In each case the primary electrodes are connected to a suitable D. C. or A. C. source of electric energy by conductors 20 and 22. An extremely hot, electrically conductive effluent 24 issues from the outlet of the nozzle 12 of the torch.

In each case the nozzle passage 13 laterally shapes, and directs and, in varying degrees, constricts and wall-stabilizes the arc-column. Such shaping, wall-stabilizing and constricting of the arc-column by the nozzle passage 13 perform several valuable functions. The voltage of the arc-column can be substantially increased, thus developing more power in the arc stream at a given current. I have found, for example, that, whereas the arc voltage in a prior unconstricted arc may be 8–20 volts per inch in argon at 200 amperes of arc current, with the higher values being associated with the column portion very close to the electrodes, the arc voltage in a constricted argon-arc of the invention is no less than about 30 volts per inch in a ¼-inch I. D. (inside diameter) nozzle, 100 volts/inch in a ⅛-inch I. D. nozzle, and 175 to 200 volts/inch in a 5/64-inch I. D. nozzle.

The higher voltage and power, and the higher attainable collimation of energy flow, provided by the invention, are demonstrated by the following data, Table I, comparing bead welds made according to the prior art and according to the invention (using cylindrical nozzle geometry as shown in Fig. 5 which is described in detail below) AISI type 304 stainless steel at 175 amperes, DC–SP, 10 I.P.M. welding speed with argon supplied to the torch.

*Table I*

|  | Arc Length, In. | Arc Voltage | Bead Width, In. | Penetration, In. |
|---|---|---|---|---|
| Unconstricted Arc | ¼ | 16 | .305 | 0.075 |
|  | ⅜ | 18 | .240 | 0.045 |
| Arc Constricted with 5/32″ I. D. Nozzle | ¼ | 26 | .255 | 0.090 |
|  | ⅜ | 29 | .260 | 0.080 |

The nozzle 12 may be made of any suitable solid material and may be cooled, if necessary, in any convenient way, for example, copper with water cooling, tungsten with radiative cooling, ceramic with or without water cooling, or the like.

The dimensions of the nozzle vary considerably for various conditions of operation and for various uses. The axial length of any electrically continuous section of the nozzle is limited by a tendency to "double arcing" which is the establishing of two arcs in series (electrode-to-nozzle, and nozzle-to-work) where only one arc (electrode-to-work) is desired. An empirical criterion for continuous stable operation is that the voltage drop along a given length of the arc-column confined within any electrically continuous nozzle portion is preferably less than that voltage which is required to establish an additional anode and cathode. Thus, for example, if it be assumed for a given case that such latter voltage when using argon gas and a water-cooled copper nozzle, is about 20 volts, then a 1/8-inch I.D. nozzle (80 volts/inch arc-column gradient in argon at 160 amperes) is preferably less than 1/4-inch long (the equivalent of 20 volts length). Longer nozzles can be used but are preferably composed of non-conducting material, or comprise electrically isolated sections when they are composed of electrically conductive material.

As shown in Fig. 3, a prior conventional inert gas shielded arc 26 between a stick-cathode 10 and a molten flat anode 28 has the general shape of a rounded cone which, when shielded by an annular stream of argon, has the observed dimensions noted in Figs. 3 and 4 for arc currents between 100 and 400 amperes. The characteristic curves X, Y and Z illustrate how the observed arc diameters at 0.1, 0.3, and 0.6 inch from the cathode 10 increase as the arc current increases in each case. By inspection, Figs. 3 and 4 show, for example, that a 1/4-inch diameter nozzle of the invention can wall-stabilize and constrict the arc portion represented at 200 amperes, curve X, Fig. 4, and by collimation of the effluent can project such diameter to the workpiece. At 0.6 inch from electrode tip, for example, this results in an arc cross-sectional area of about one-third that of the arc of Fig. 3.

An arc torch T, Fig. 5, that is suitable for welding metal, comprises a copper nozzle 30 having a central socket 32 in which the lower end portion of the electrode 10 depends in spaced relation to the inner wall and bottom of such socket, providing a passage therebetween for the arc gas. Such gas flows through an elongated arc passage or orifice 34 that is axially aligned with such electrode. Such passage 34 is elongated and carries a pilot arc that operates continuously between the nozzle and such electrode when a source of current S is connected thereto by leads 20, 22 and 38 through a resistor 40, such as a lamp or bank of lamps.

The nozzle 30 is also provided with an annular groove 36 in the bottom thereof that is concentric with the orifice 34, for directing an outer annular stream or envelope 44 of suitable shielding gas, such for example as argon or $CO_2$, about a zone to be melted on the workpiece 14. A main arc 42 is initiated by such pilot arc, between the end of said electrode 10 and such workpiece 14, when the latter is connected to a terminal of such source by a lead 48. In such case the nozzle is kept cool by force-circulating water through an annular passage 50 surrounding the socket 32.

The torch of Fig. 5 operates very well when the negative side of a D. C. source S is connected to the electrode 10, and the positive side is connected to leads 38 and 48 by conductor 22. Such torch will also operate well when connected to an A. C. source of power. In such case lead 48 is connected directly to one terminal of an A. C. welding source and electrode 10 is connected to the other terminal. A continuously operated 30 amp. D. C. pilot arc, for example, will effectively initiate, stabilize and maintain a main A. C. welding arc. Such pilot arc may be operated continuously, even during the operation of the main arc.

In operation the torch T is moved in the direction of a path to be butt-welded in the workpiece 14, and the effluent 24, which is shielded from the air by the outer annular shielding gas stream 44, melts a seam 51 in the workpiece, which, as the effluent 24 moves away, cools and solidifies. A remarkable feature of the torch T is that the effluent 24 is well collimated and produces a remarkably small variance in weld bead dimensions over a wide range of torch elevations with respect to the work as seen in Table I. The torch T is also well suited for flange-welding sheet metal parts at a rapid rate.

A small arc torch like that of Fig. 5 was used to weld 0.007 inch thick stainless sheet at 25 I. P. M. using 15 amperes DS–SP, 3/4 C. F. H. argon through a 1/16-inch diameter center orifice, and about 25 C. F. H. argon in the surrounding envelope. The effluent 24 was stable, easily controlled, and had no tendency to wander even at current values of as low as 8 amperes.

As shown in Fig. 6 there is provided a torch T1 of the invention comprising a primary electrode 10 that is axially mounted within a cylindrical barrel 52 in the end of which is secured a nozzle 54 having a central passage 55 into which the lower end of the electrode 10 projects. The discharge section of the passage 55 tapers to an outlet orifice of reduced diameter. The annular wall of the nozzle 54 is spaced from the inner wall of the barrel 52 to provide an annular passage 56, sealed by O rings 57, 57, for cooling water which is fed thereto through an inlet 58 and discharged therefrom through an outlet 60.

The nozzle 54 preferably is composed of copper and the electrode 10 of thoriated tungsten. The electrode 10 is connected to the negative side of a direct current source S by lead 20, while the positive side of such source is connected to the work 14 by leads 22 and 48. The nozzle is also connected to the positive side of such source by branch circuit 38 that includes resistance 40 which limits the amount of current to that which is sufficient to maintain a pilot arc between the primary electrode 10 and the nozzle 54 which, in this case, constitutes a secondary electrode (anode). A suitable gas is delivered to the interior of barrel 52. In a manner similar to that described for the torch of Fig. 5, the torch of Fig. 6 will also operate well when connected to an A. C. welding power source.

The effluent 24 discharged by the torch T1 is well collimated, and with a length up to 1.5 inches, for example, is exceedingly stable. Typical performance data of the torch T1 are as follows: With a 200 ampere arc, 0.5 inch long, a 5/32-inch I. D. nozzle, and 20 C. F. H. of argon, the arc potential is 38 volts, the calculated effluent velocity is about 1000 F./S., and the heat applied, i. e. delivered, to the workpiece is 5.2 kw. This compares with a conventionally unconstricted argon gas arc potential at the same arc length of 19 volts, and heat applied to the workpiece of 2.7 kw. An approximate calculation of the relative power intensities at the work for such examples shows about a ten-fold advantage for the torch of the invention. Any suitable gas which has no harmful effect on the electrodes may be used.

At higher gas flow rates (30 C. F. H. or more for a 1/8-inch I. D. nozzle, for example), the effluent 24 produces a powerful metal cutting (severing) action. With a 1/8-inch I. D. nozzle, 80 C. F. H. argon, and 200 amperes of arc energizing current, for example, the effluent can sever, by kerf-melting, a 3/8-inch thick plate of aluminum at a severing (traverse) speed of about 85 I. P. M. Other examples, shown in Table II below, are illustrative of some plate severing speeds obtained according to the invention for various metals using DC–SP and a 1/8-inch I. D. nozzle.

Table II

| Material (Plate) | Thickness (inches) | Speed (I.P.M.) | Current (Amperes) | Voltage (Volts) | Argon (C.F.H.) |
|---|---|---|---|---|---|
| Aluminum | ¼ | 144 | 340 | 56 | 110 |
| Do | ½ | 70 | 380 | 66 | 110 |
| Do | ¾ | 30 | 260 | 64 | 100 |
| Do | 1 | 15 | 260 | 75 | 110 |
| Brass | ¼ | 100 | 280 | 69 | 110 |
| Do | ½ | 30 | 270 | 69 | 110 |
| Copper | ¼ | 45 | 340 | 66 | 110 |
| Magnesium | ¼ | 144 | 250 | 54 | 110 |
| Do | ¾ | 110 | 460 | 60 | 110 |

In Fig. 7 there is illustrated a modification of the invention comprising an arc torch T2 having a liquid-cooled anode 76 that is connected to the positive terminal of a D. C. power source S by means including a lead 78. A combined cup-nozzle 80 of such torch is connected so as to constitute a secondary cathode by being connected to the negative terminal of such source by a branch circuit 82 including a resistor 84. The workpiece W is also connected to such negative terminal by a lead 86. The anode 76 is composed of suitable metal such as copper, and is provided with an elongated axial socket 88 within which is mounted a cooling-water inlet pipe 90 that terminates just above the bottom of such socket, and is spaced from the inner wall of the socket to provide an annular outlet passage for the cooling water.

The arc-locus end of the anode 76 is rounded and spaced from a similarly shaped internal surface of the cup-nozzle 80, providing a gas passage 92 that delivers gas, such as argon, to a passage 94 in the bottom of the cup in line with the tip of such anode. The cup-nozzle 80 is provided with an annular recess 96 that is sealed with a sleeve 98 and O-rings 100, providing an annular cooling-liquid passage into which water is introduced at 102 and discharged at 104.

The effluent 24 produced by the torch T2 when direct current at 240 amperes is supplied to the lead 86 at 50 volts potential between the anode 76 and the work W was used to cut (sever) one-inch thick aluminum plate W at 5 inches/minute, leaving a ⅜-inch wide kerf. In such case 30 C. F. H. of argon was supplied to the torch. A 10 ampere direct current supplied to cup 80 and anode 76 continuously energized a pilot arc between the primary anode and the secondary cup-cathode that performs very well in establishing the main arc between the primary electrodes 76 and W. The cup 80 and anode 76 are preferably composed of copper, but tungsten or any other suitable metal may be used.

An important novel feature of the invention is that an arc can be controlled according to the invention to produce an effluent shaped or split as desired, as shown in Figs. 8 and 10 for example. Figs. 8 and 9 illustrate the phenomenon in which a fan-shaped effluent V results in conformity with the cross-sectional shape of a passage 115 in a water-cooled nozzle 116 when the gas velocity is sufficiently high, 10 C. F. H. of argon, for example, flowing through a 0.10 inch x ⅜-inch slotted nozzle exit. In such case the effluent is stable, the argon being supplied to the annular space 118 between the electrode 10 and the wall of an axial passage 120 in the nozzle.

In the case of Fig. 10, an arc can even be split in two parts by means of a nozzle 125 having two divergent arc passages 126, 128 which originate from a common passage 130 containing the electrode 10. This is most unique and produces stable effluents 122, 124 which are suitable for many uses, such as welding and cutting, since they can be given desired shape and direction. Any desired number of effluents can be provided.

In the present invention the total heat delivered by the effluent to a workpiece comes from the arc plasma within the nozzle, from the arc-column between workpiece and nozzle, and from varied electrode processes. Analysis of thermal transfer data for argon gas operation shows that at zero gas flow, essentially none of the heat developed by the arc in the nozzle leaves the nozzle, but such heat is lost largely to the cooling water of the nozzle. Most of the heat reaching the work in such case is accounted for by electrode processes such as electron condensation. (Heating by condensation equals electron current times material work function plus anode fall.)

For example, using DC-SP and a ¼-inch I. D. nozzle of ⅜-inch length, the heat lost to the nozzle decreases continuously to a minimum of about 40 percent of that developed in the nozzle with increases in argon gas flow up to 20 C. F. H. This means that at 20 C. F. H. roughly 60 percent of the heat developed in the arc plasma within the nozzle is contained in and is discharged with the hot argon issuing from the nozzle. This heat in turn is delivered by the effluent to the workpiece with efficiencies of better than 70 percent for nozzle-to-work distances of ⅛-inch to ¼-inch.

Approximate quantitative picture of these phenomena is presented in Table III below which uses volts as a convenient measure of energy at the 200 ampere current level (DC-SP). A ¼-inch inside diameter by ⅜-inch length cylindrical nozzle and a ¼-inch external arc length was used.

Table III

| From— | Zero Argon Flow | | 20 C. F. H. Argon Flow | |
|---|---|---|---|---|
| | Volts Developed | Volts Delivered to Work | Volts Developed | Volts Delivered to Work |
| Arc Plasma in Nozzle | 12 | 0 | 16 | 8 |
| Arc Plasma Outside Nozzle | 5 | 2 | 6 | 5 |
| Electron Condensation | 7 | 7 | 7 | 7 |
| Total | 24 | 9 | 29 | 20 |
| Efficiency, percent | 35 | | 70 | |

It is thus seen that at 20 C. F. H. argon flow, the power contribution from the arc plasma inside the nozzle is of major importance.

Referring to the graphs shown in Figs. 12–15, curve B. Fig. 12, shows the voltage gradient in the nozzle versus nozzle diameter for cylindrical nozzle geometry. The vertical reference band C in the left of the graph denotes the voltage gradients in an open argon arc 26, Fig. 3. As shown, as the nozzle diameter becomes larger (and the arc-column constriction less) the voltage gradient curve B of the arc torch approaches and joins the prior inert gas shielded-refractory electrode arc characteristic C. For the smaller nozzle diameters the voltage gradient is many times that of such prior arc gradient C. In Fig. 12 the ⅜-inch diameter orifice will constrict the arc only very moderately as evidenced by a slight increase in voltage gradient over the minimum represented in band C; the arc portion within the nozzle is, however, very effectively wall-stabilized. Incipient constriction as evidenced by voltage curves analogous to Fig. 12 can be used as a general criterion for the existence of effective wall-stabilization.

Figure 13:
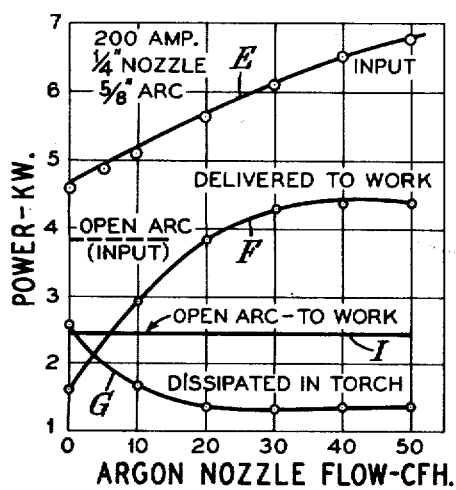

Fig. 13 shows power distributions versus gas flows through the nozzle in the arc torch at a fixed current DC-SP (the nozzle is cylindrical and is ⅜-inch in length). The total electrical power input (volts × amperes) curve E increases almost linearly with gas flow at a rate of about 40–50 watts per C. F. H. gas flow increase. This same nozzle, operated at a lower current, produces a relatively flatter voltage vs. gas flow characteristic. The power delivered-to-work curve F increases rapidly up to 20–30 C. F. H. The power lost-to-nozzle curve G decreases up to 20 C. F. H. and remains at a nearly constant minimum value at higher gas flows. For comparison, the total power (input) line H and the power-to-work line I of a prior unrestricted argon-shielded arc of the same length (⅝-inch) and current (200 amperes) are shown. The arc torch of the invention at 40 C. F. H. through the nozzle, thus delivers 75 percent more power to the work than does the prior conventional argon shielded arc. (The power distribution in prior conventional inert gas shielded arc is not given as a function of gas flow, since any forced movement of the atmosphere in such case has only minor secondary effects.)

Figure 14:
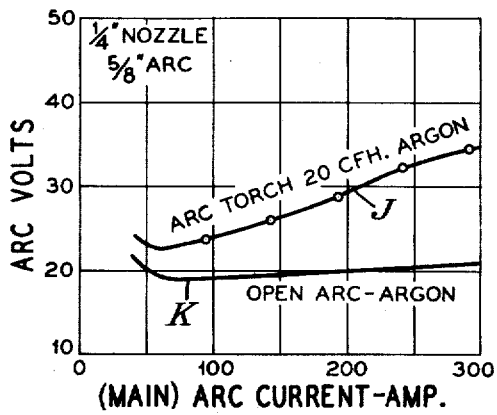
Figure 15:
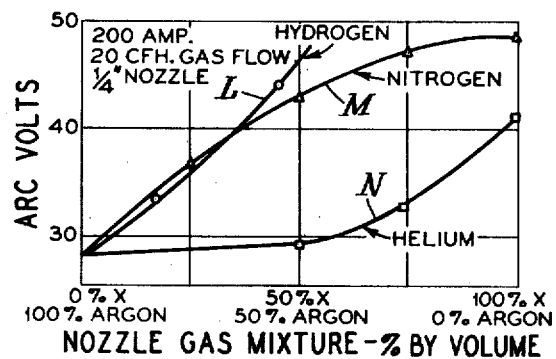

Curves J and K, Fig. 14, illustrate voltage versus current arc-characteristic of the arc torch (with a ¼-inch diameter nozzle), and of the open or unconstricted argon shielded arc of the prior art, respectively. It can be seen that the increase in voltage with current, curve J, is much greater in the arc torch. A practical consequence of this is that, in contrast to the prior conventional nonconsumable electrode torch, the main power supply for the arc torch of the invention need not have a drooping volt-ampere characteristic in order to maintain a controllable degree of variation in the arc current. For example, with a $\frac{5}{32}$-inch inside diameter by $\frac{3}{16}$-inch length nozzle arc passage, using 30 C. F. H. argon gas, and 35 volts constant voltage DC–SP, the arc length external to the nozzle was changed from ¼-inch to ⅛-inch with an attendant current change from 100 to 130 amperes. The current in the prior conventional non-consumable argon shielded arc would change by several times this amount with the same kind of power source.

Arc torches of the invention have been operated with He, $N_2$, and $H_2$ gases, and with mixtures of such gases with argon. Variations of arc voltage with percent of He, $N_2$, and $H_2$ by volume in argon are shown by the characteristic curves L, M and N, Fig. 15, for DC–SP. However, the invention is not necessarily limited to such gases, since any gas or mixture of gases that is suitable may be used.

Features of the invention include:

1. The nozzle is not a primary electrode, but is only a secondary electrode in those cases involving a pilot arc.
2. Since the higher arc power developed by constricting the arc is only in part lost to the arc-shaping nozzle, unexpectedly large quantities of additional power go to the workpiece in the form of heat.
3. Since the effluent-controlling nozzle is substantially non-consumable, contamination is minimized and commercially useful nozzle life is attained.
4. It is noteworthy that a nozzle composed of an electrical conductor, such as metal, can be operated at all without "double arcing" in series with the nozzle, i. e., forming one arc between the primary torch electrode and the nozzle and a second arc between the nozzle and the work in series circuit relation.
5. It is also noteworthy that the main arc is not extinguished at the gas velocities in the arc-column up to many thousands of feet per second.
6. The prior conventional arc has heretofore been conventionally the most intense (commercial) source for heating metal. The invention excels such prior conventional counterpart as a source of intense heat by many times because:

(a) It can be shaped to reduce the cross-sectional area of the arc. For example, an arc of $\frac{7}{16}$-inch cross section reduced to ⅛-inch is 12 times more intense due to constriction alone.

(b) It increases the heat developed by the arc at a given current and length by voltage, and thereby power, increases due to constriction and to the flow of gas much of which is heated to arc temperature. For example, at 200 amperes and ½-inch arc length at 80 C. F. H. argon through a ⅛-inch inside diameter nozzle the power developed in the torch of the invention is more than doubled over that of its prior conventional counterpart.

(c) The calculated net result of the two effects for the last chosen example is an approximately 20-fold increase in effective power intensity.

7. The cross-sectional shape of the arc effluent discharged from the nozzle conforms to the cross-sectional shape of the arc constricting passage even when cylindrical nozzle geometry is not employed, provided the gas velocity is sufficiently high.
8. Another valuable feature is that the arc can be made to divide itself spontaneously into multiple effluents corresponding to available nozzle passages provided therefor.
9. Compared with the characteristic of the prior inert gas shielded-refractory electrode unrestricted-arc, the arc of the invention has a more sharply rising volt-ampere characteristic. Thus, in addition to conventional "drooping" characteristic sources of power, the arc torch of the invention can be used with power sources having a more or less flat volt-ampere characteristic.

The term "high-pressure" arc as used herein is discussed (pages 290 and 326) by Cobine in his book, "Gaseous Conductors," published in 1941 by McGraw-Hill and is to be understood to relate to self-sustaining gas discharges in the general pressure range above $\frac{1}{20}$ atmosphere and generally in the current range of a few to thousands of amperes.

I claim:

1. Process which comprises establishing a high-pressure arc between an electrode and a workpiece, wall-stabilizing a portion of the length of such arc, to produce and control the shape and direction of an effluent between the point of such wall-stabilization and said workpiece, and applying the so-controlled effluent to said workpiece.

2. Process which comprises establishing a high-pressure arc between an electrode and a workpiece, laterally constricting a portion of the length of such arc to produce, concentrate the heating intensity and control the shape and direction of an effluent between the point of such constrction and said workpiece, and applying such effluent which is so-controlled to said workpiece.

3. Process as defined by claim 2, in which the workpiece is metal and the effluent is used to melt a bead therein.

4. Process as defined by claim 3, in which an annular stream of suitable gas is used to shield such effluent and the adjacent metal of the workpiece.

5. Process which comprises discharging a stream of gas through and from a nozzle, establishing through such nozzle a high-pressure arc between electrodes located adjacent the gas inlet and outlet of such nozzle, one of said electrodes consisting of a workpiece in circuit with such arc and toward which gas is directed, and wall-stabilizing such arc within such nozzle.

6. Process as defined by claim 5, in which a pilot arc is struck between such nozzle and such electrode adjacent the gas inlet for initiating such arc to the workpiece.

7. Process of forming, concentrating and directing an effluent which comprises striking an arc between spaced primary electrodes one of which comprises a workpiece, and directing such arc through a solid provided with an arc constricting passageway that wall-stabilizes and discharges an arc-gas effluent, confines such effluent to a predetermined path, and concentrates the power intensity thereof.

8. Process of melting a selected zone of a metal workpiece which comprises connecting the work-piece and an electrode in circuit with a source of arc current, striking an arc between such electrode and such workpiece, wall-stabilizing a portion of the length of such arc with a water-cooled nozzle through which such arc passes, feeding selected gas to the inlet of such nozzle, discharging the resulting directionally stable effluent from the outlet of such nozzle, applying such effluent to such workpiece, and melting such selected zone of metal therewith.

9. Process as defined by claim 8, in which the metal workpiece is welded by removing the effluent from the melted metal of such zone, permitting such melted metal to cool and solidify.

10. Process as defined by claim 8, in which the metal workpiece is cut by removing the so-melted metal from the rest of the workpiece.

11. Process which comprises forming a high-pressure arc between a non-consumable electrode and a workpiece, passing such arc through a cooled-solid nozzle which wall-stabilizes a portion of such arc, and feeding a selected gas through such nozzle for issue therefrom with such arc toward such workpiece.

12. The combination comprising means for forming a current-carrying high-pressure arc, means for wall-stabilizing and discharging an effluent comprising such arc and a suitable gas, said means for forming such arc-gas effluent comprising two electrodes, one of which is a workpiece, and an essentially non-consumable nozzle through which the arc and gas flow and in which the discharged effluent is shaped.

13. The combination as defined by claim 12, in which means are provided for supplying the arc power in the form of direct current at reverse polarity.

14. The combination as defined by claim 12, in which means are provided for supplying the arc power in the form of arc direct current at straight polarity.

15. The combination as defined by claim 12, in which means are provided for supplying the arc power in the form of alternating current.

16. The combination as defined by claim 12, in which means are provided for establishing a pilot arc.

17. An arc torch comprising, in combination, an electrode, a relatively cold annulus provided with an arc shaping passage axially aligned with said electrode, means for establishing a high-pressure arc through said passage between the end of said electrode and another electrode, means for feeding gas to such passage, the effect of the relatively cold inner surface of said arc shaping passage being to produce a directionally stable effluent which issues from such passage.

18. An arc torch comprising the combination of an electrode, an arc modifying nozzle surrounding the tip of said electrode, means for feeding gas to the inlet of said nozzle, and means for connecting said electrode to a source of power for drawing a high-pressure arc from the tip of said electrode and through said nozzle to a workpiece which is also connected to such power source, the internal size of said nozzle being such that an effluent issues therefrom that is composed of a jet of gas and arc plasma stream, the shape of which effluent is determined by the geometry of said nozzle.

19. An arc torch as defined by claim 18, in which the cross-sectional size of the interior of said nozzle is substantially less than that which such arc would be naturally in the absence of such nozzle.

20. The combination of a primary electrode in the form of a pencil, a nozzle having an arc-constructing orifice axially aligned with said pencil, the surface of said orifice being spaced from one end of said electrode and an arc-gas effluent producing passage below the end of such electrode, means for cooling said nozzle, said nozzle comprising a secondary electrode, circuit means for connecting said primary and secondary electrodes to terminals of a source of current for energizing an arc therebetween, circuit means for connecting said primary electrode and a workpiece, respectively, to such terminals for energizing another arc between the end of said electrode and the workpiece, and means for delivering a suitable gas stream to said annular gas passage.

21. The combination of at least three spaced electrodes at least one of which is provided with an internal cooling-liquid passage, and at least one of which is provided with a passage for producing an arc-gas effluent, means for connecting two of said electrodes across a source of power for energizing a main arc, and means including an impedance for connecting such power source across one of said two electrodes and to another electrode for energizing a pilot arc.

22. The combination as defined by claim 21, plus means for feeding gas to said passage.

23. An arc torch comprising non-consumable means provided with a plurality of passages for an arc which split such arc into a plurality of arc effluents corresponding to such passages.

24. In combination, a gas shielded arc torch comprising a central electrode having a pointed tip, a water-cooled nozzle having a tapered gas passage leading to an arc constricting orifice in axial alignment with said central electrode, circuit means for energizing a direct current pilot arc in the interspace therebetween, means for feeding selected arc gas to the annular space between said electrode and nozzle, which gas is discharged from such orifice with such direct current pilot arc as a concentrated stream including ionized gas, and means for connecting said central electrode to a suitable source of current for energizing a high-pressure arc between said electrode and a workpiece, which high-pressure arc is piloted through such arc constricting orifice between the tip of said central electrode and said workpiece by such concentrated stream of ionized gas, providing an intense jet-like effluent that is heated by both of such arcs.

25. In combination, a gas shielded arc torch comprising a central electrode having a pointed tip, a water-cooled copper nozzle having a tapered gas passage leading to an arc constricting orifice in axial alignment with said central electrode, said nozzle being electrically insulated from said central electrode, circuit means for connecting said nozzle and said electrode to a suitable source of current for energizing a direct current pilot arc in the interspace therebetween, means for feeding selected arc gas to the annular space between said electrode and nozzle, which gas is discharged from such orifice with such direct current pilot arc as a concentrated stream comprising ionized gas, and means for connecting said central electrode to a suitable source of current for energizing a high-pressure direct current arc between said electrode and a workpiece composed of metal, which high-pressure arc is piloted through such arc constricting orifice between the tip of said central electrode and said workpiece by such concentrated stream of ionized gas, providing an intense jet-like effluent that is heated by both of such arcs.

26. The combination with an electric arc torch comprising a central electrode and a gas cup of metal having an annular gas outlet orifice that is concentric with one end of said central electrode; of a direct current source connected across said electrode and cup for energizing a D. C. pilot-arc between such electrode end and the inside of said orifice, a source of arc gas connected to the annular space between said electrode and orifice for discharging a stream of D. C. pilot-arc ionized gas from such orifice of said cup, and a circuit for energizing a main arc between such electrode end and an external electrode when such D. C. pilot-arc ionized gas stream is applied to such external electrode.

27. The combination with an inert gas shielded arc torch comprising a metal cup from which gas is discharged around a non-consumable metal electrode, which cup and electrode are electrically insulated from each other, of a source of current connected across said cup and electrode, which energizes a D. C. pilot-arc therebetween which keeps the end of said electrode sufficiently hot to initiate a main arc between such electrode and a workpiece when the latter are connected to a source of current, and means for connecting a source of current across said electrode and a workpiece for energizing a main arc therebetween, which is initiated by said D. C. pilot-arc.

28. An arc torch comprising, in combination, an electrode, a relatively cold annulus provided with an arc shaping passage, means for establishing a high-pressure arc through said passage between the end of said electrode and another electrode, means for feeding gas to such passage, the effect of the relatively cold inner surface of said arc shaping passage being to produce a directionally stable effluent which issues from such passage.

29. An arc torch comprising, in combination, an electrode, a relatively cold nozzle having divergent arc shaping passages which originate from a common passage containing said electrode, means for establishing a split high-pressure arc through said passages between the end of said electrode and another electrode, the effect of the relatively cold inner surfaces of said arc shaping passages being to produce separate directionally stable effluents which issue from such divergent passages.

References Cited in the file of this patent

UNITED STATES PATENTS

| | | |
|---|---|---|
| Re. 21,897 | Taylor | Sept. 2, 1941 |
| 650,124 | Coleman | May 22, 1900 |
| 1,002,721 | Mathers | Sept. 5, 1911 |
| 2,106,692 | Embleton | Jan. 25, 1938 |
| 2,284,351 | Wyer | May 26, 1942 |
| 2,308,510 | Herman | Jan. 19, 1943 |
| 2,516,016 | Pakala | July 18, 1950 |
| 2,522,482 | Olzak | Sept. 12, 1950 |
| 2,587,331 | Jordan | Feb. 26, 1952 |
| 2,686,860 | Buch | Aug. 17, 1954 |
| 2,768,279 | Rava | Oct. 23, 1956 |
| 2,770,708 | Briggs | Oct. 23, 1956 |

UNITED STATES PATENT OFFICE

CERTIFICATE OF CORRECTION

Patent No. 2,806,124                            September 10, 1957

Robert M. Gage

It is hereby certified that error appears in the printed specification of the above numbered patent requiring correction and that the said Letters Patent should read as corrected below.

Column 1, line 31, for "a stable" read --is stable--; line 43, for "construction" read --constriction--; column 6, line 17, for "DS-SP" read --DC-SP--; column 10, line 37, for "constrction" read --constriction--; column 11, line 56, for "arc-constructing" read --arc-constricting--.

Signed and sealed this 3rd day of December 1957.

(SEAL)
Attest:

KARL H. AXLINE
Attesting Officer

ROBERT C. WATSON
Commissioner of Patents